(12) United States Patent
Maciejczyk (10) Patent No.: US 6,560,825 B2
(45) Date of Patent: May 13, 2003

(54) WEBBING LENGTH ADJUSTOR

(75) Inventor: Wieslaw Maciejczyk, Sunshine (AU)

(73) Assignee: Britax Child-Care Products Pty Ltd., Sunshine (AU)

( * ) Notice: Subject to any disclaimer, the term of this patent is extended or adjusted under 35 U.S.C. 154(b) by 0 days.

(21) Appl. No.: 09/829,185

(22) Filed: Apr. 9, 2001

(65) Prior Publication Data

US 2001/0039696 A1 Nov. 15, 2001

(30) Foreign Application Priority Data

May 11, 2000 (AU) .............................. PQ 7422

(51) Int. Cl.$^7$ ................................................ A44B 11/12
(52) U.S. Cl. .......................................... 24/170; 24/191
(58) Field of Search .................. 24/132 AA, 132 WL, 24/133, 134 KA, 134 KB, 134 R, 115 R, 132 R, 69 R, 70 ST, 69 CT, 71 ST, 71 TP, 68 CD, 68 A, 68 E, 68 D, 170, 265 CD (56) References Cited

U.S. PATENT DOCUMENTS

| | | | | |
|---|---|---|---|---|
| 282,267 A | * | 7/1883 | Burt | 24/170 |
| 300,303 A | * | 6/1884 | Butler | 24/170 X |
| 362,595 A | * | 5/1887 | Allen | 24/170 |
| 511,310 A | * | 12/1893 | Pugh | 24/170 |
| 1,079,080 A | * | 11/1913 | Ward | 24/170 |
| 1,380,705 A | * | 6/1921 | Conner | 24/170 |
| 2,423,977 A | * | 7/1947 | Hunter | 24/134 R |
| 2,538,641 A | * | 1/1951 | Elsner | 24/170 |
| 2,845,674 A | * | 8/1958 | Pearson | 24/134 KB |
| 4,727,628 A | * | 3/1988 | Rudholm | 24/170 |
| 5,392,535 A | * | 2/1995 | Van Noy et al. | 36/50.1 |
| 5,423,108 A | * | 6/1995 | Brennan | 24/134 R |
| 6,230,370 B1 | * | 5/2001 | Nelsen | 24/68 CD |
| 6,295,700 B1 | * | 10/2001 | Plzak | 24/134 R |

* cited by examiner

Primary Examiner—James R. Brittain
Assistant Examiner—Ruth C. Rodriguez
(74) Attorney, Agent, or Firm—Davis & Bujold, P.L.L.C.

(57) ABSTRACT

A webbing length adjustor adapted to clamp webbing when tension is applied to a tension end of the webbing. The adjustor has a webbing guide, a clamp element pivotally mounted on the webbing guide, a locking cam on the clamp element which in a locked position clamps the webbing between the locking cam and the webbing guide to prevent movement of the webbing through the adjustor when tension is applied, a release actuator, and a projection on the clamp element that abuts against the webbing between the locking cam and the tension end thereof so that the webbing exerts a force against the projection which urges the clamp element in a direction that holds or moves the locking cam in or into a locked position. The projection is adapted to always slightly deflect the webbing, even when the clamp element is in its locked position.

15 Claims, 7 Drawing Sheets

WEBBING LENGTH ADJUSTOR

FIELD OF INVENTION

This invention relates to a webbing length adjustor, and in particular to adjustors which use clamping elements that have cam shaped surfaces to clamp webbing with respect to the adjustor.

BACKGROUND OF THE INVENTION

Such adjustors are commonly used with restraint and seat belt webbing. The webbing which passes through the adjustor has tension applied on one side of the adjustor which locks the webbing with respect to the adjustor. Pulling the webbing on the other side of the adjustor will release the clamping force and allow the webbing to be pulled through the adjustor.

For example, a shoulder harness in a child restraint or safety seat uses such an adjustor to allow tensioning of the shoulder straps. A locking cam in the adjustor is shaped so that applying tension to the free end of the webbing will cause rotation of the arm to release the webbing. The webbing can then be pulled through the adjustor to tighten the shoulder straps.

After adjusting the webbing, the cam is caused to rotate to a locking position to apply clamping force to the webbing.

The rotation of the cam is assisted by a spring which moves the cam in the required direction to clamp the webbing. The surface of the cam has a series of ridges which bite into the webbing surface. The cam is shaped so that further tension applied to the webbing causes it to rotate further and to thereby increase the clamping force.

Known adjustors have a manual actuator which enables rotation of the cam to release the clamping force and allow the webbing to move in either direction through the adjustor. This enables loosening of the webbing when increased length is required for a seat belt or shoulder harness. A spring is required to ensure that the cam rotates far enough to enable the serrated edges of the cam to abut against the webbing. This engagement will then ensure that the clamping force applied to the webbing will increase as the tension applied to the webbing increases.

The aim of this invention is to provide an alternative arrangement of adjustor and to have an adjustor which has a reduced number of components with an improved ease of manufacture and assembly.

BRIEF DESCRIPTION OF THE INVENTION

The invention is therefore said to reside in a webbing length adjustor adapted to clamp webbing having a free end and a tension end when tension is applied to the tension end of the webbing, the adjustor comprising;
  a webbing guide,
  a clamp element pivotally mounted with respect to said webbing guide,
  a locking cam on said clamp element which in a locked position clamps said webbing between said locking cam and said webbing guide to prevent movement of said webbing through said adjustor when said tension is applied to the tension end,
  a release actuator to cause rotation of said clamp element to move said locking cam to a position where said webbing is released to allow it to move in either direction through said adjustor, and
  a projection on said clamp element that abuts against the webbing between the locking cam and the tension end thereof so that said webbing when tensioned exerts a force against said projection which urges or causes rotation of said clamp element in a direction that holds or moves said locking cam in or into said locked position.

As can be seen from the above description, the invention avoids the need for the use of a spring to rotate the locking element into a position where it engages the webbing. Instead, the projection causes a deflection of the webbing when the clamp element rotates to an unlocked position. Tension applied to the webbing acts to straighten the deflected webbing. This causes a force to be applied to the projection which rotates the clamp element and locking cam towards the webbing.

The projection can be designed to always slightly deflect the webbing, even when the clamp element is in its locked position. This will ensure that there is some positive force urging the locking cam towards the webbing. Rotation of the clamp element by application of tension onto the webbing will cause further gripping of the locking cam against webbing. The greater the deflection of the webbing, the more force is applied to the projection when tension is re-applied to the webbing.

The webbing guide may comprise a bracket which has a surface over which the webbing locates. The locking cam acts to clamp the webbing against the surface. In a case of child restraints, the bracket may be adapted to be attached to the molded shell of the restraint.

Alternatively, where the webbing length adjuster is associated with a child safety seat, the shell of the child safety seat may be molded to form the required webbing guide. The clamp element can then be pivotally attached with respect to the molded webbing guide.

Preferably, the locking cam has a surface designed to grip or otherwise positively catch against the surface of the webbing. This surface may have knurling or a plurality of saw tooth projections that extend the width of the locking cam surface. Each saw tooth projection has a sharp edge which will dig into and grip the surface of the webbing.

The release actuator preferably comprises a manual actuator. This may be a flange which is lifted or pushed by a person's fingers. By lifting or pushing the flange, the clamping element may be rotated to release the webbing.

Alternatively, the release actuator comprises a button actuator which may be used to cause rotation of the clamp element.

The projection on the clamp element may be of an arcuate flange that extends away from the axis of rotation of the clamp element.

The webbing guide may be provided with a recess into which the projection locates. The webbing is pushed into the recess by the projection so that its path from the locking cam is into the recess, around the end of the projection and back out of the recess and onto a surface of the webbing guide. This can result in a more positive force being applied by the webbing to the projection when tension is applied to the webbing.

Alternatively, the invention may include any form of projection that deflects the line of the webbing so that a rotation force is applied to the cam element when tension is applied to the webbing.

BRIEF DESCRIPTION OF THE DRAWINGS

In order to fully understand the invention, preferred embodiments will now be described. However, it will be realised that the scope of the invention is not restricted to the features of these embodiments. The embodiments are illustrated in the accompanying drawings in which.

DETAILED DESCRIPTION OF PREFERRED EMBODIMENTS

Figure 1:
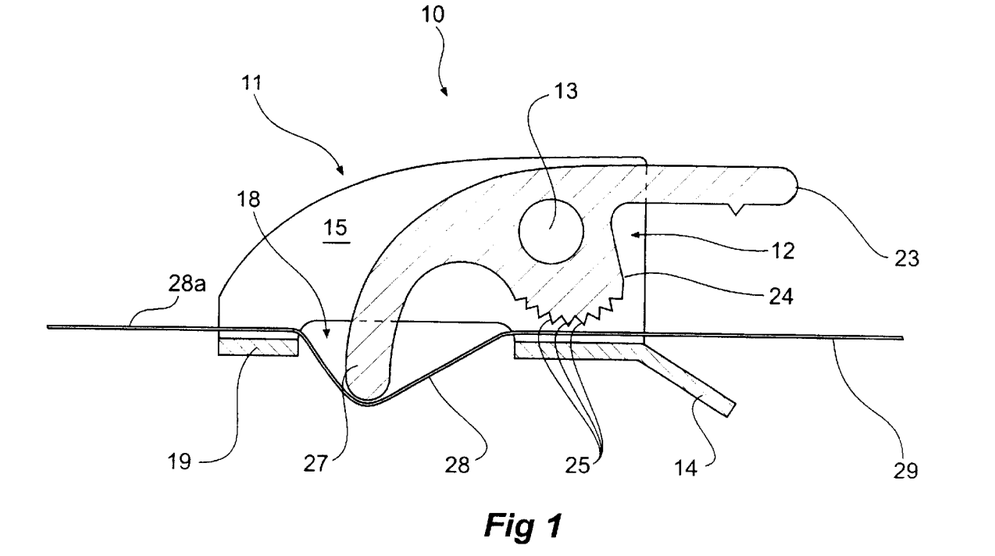
FIG. 1 shows a cross sectional view of an adjustor with the clamp element in an unlocked position.
Figure 2:
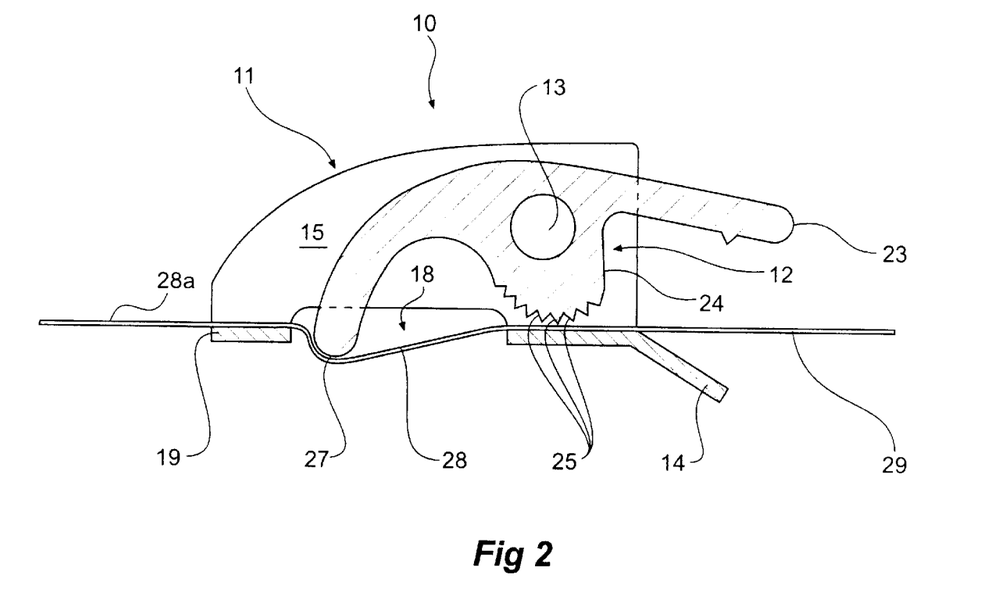
FIG. 2 shows a cross sectional view of an adjustor with the clamp element in a locked position.
Figure 3:
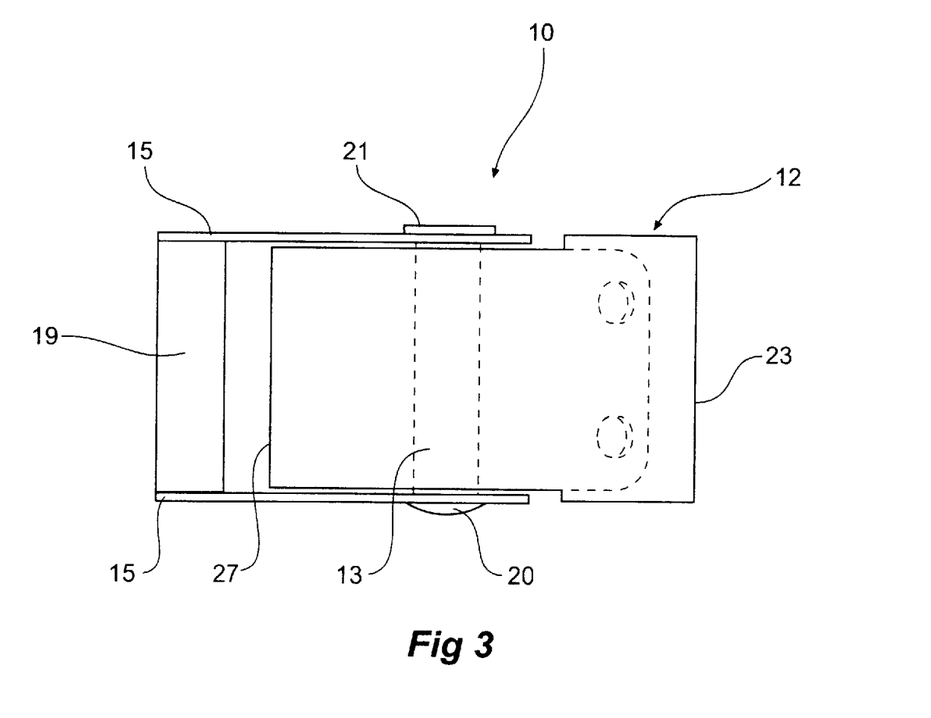
FIG. 3 shows a plan view of an adjustor.

Referring to FIGS. 1 to 3 the adjustor 10 comprises a webbing guide which in this embodiment is a metal bracket 11. A clamp element 12 is pivotally mounted to the bracket 11 via shaft 13. The bracket 11 is U-shaped and comprises a webbing guide surface 14 and a pair of side walls 15 on either side of the guide surface 14. There is an aperture 18 between the guide surface 14 and a guide bar 19. The shaft 13 locates through a pair of apertures within the side walls 15. The shaft 13 has a head 20 at one end and either a swaged end or threaded nut 21 which holds the shaft 13 in place in the bracket 11.

The clamp element 12 comprises has a manual actuator, which in this embodiment is flange 23 that is manually lifted to cause rotation of the clamp element 12. The clamp element 12 has a locking cam 24 with an arcuate surface comprising saw tooth ridges 25. The center of the part circle forming the arcuate surface of the locking cam 24 is displaced from the longitudinal axis of the shaft 13. Downward movement of the flange 23 will result in the surface of the locking cam 24 moving towards the guide surface 14 as shown in FIG. 2.

The clamp element 12 also has a projection 27 that comprises an arcuately shaped flange that extends away from the locking cam 24 and the shaft 13. The projection 27 moves downwardly into the aperture 18 when the clamp element 12 is rotated by lifting flange 23.

Both FIG. 1 and FIG. 2 show the path taken by the webbing 28 through the adjustor 10. Webbing 28 passes between the guide surface 14 and the locking cam 24 and passes over the aperture 18 and guide bar 19. Referring to FIG. 2, the webbing 28 is to be prevented from moving when tension is applied to the tension end 28a of the webbing 28 on the left hand side of the actuator. The webbing 28 extending on the right hand side of the actuator 10 is a free or loose end 29 which is used to adjust the length of the webbing 28 on the left hand side of the adjustor 10. When the free end webbing 29 is pulled, a turning movement is applied to the clamp element 12 which moves the locking cam 24 away from the webbing 28 to release the clamping force. This enables the webbing 28 to be adjusted without having to manually manipulate the clamp element 12.

Rotation of the clamp element 12 into the unlocked position, as shown in FIG. 1, results in the projection 27 pressing onto and deflecting webbing 28 through the aperture 18. When tension is again applied to the left hand side or tension end 28a of the webbing 28, the deflected portion of the webbing is pulled upwardly and applies a force to the projection 27. This in turn rotates the clamp element 12 into the locked position. As soon as the saw tooth ridges 25 abut against the webbing 28, further movement of the webbing 28 will result in the locking cam 24 rotating into the locked position. This is shown in FIG. 2. Even in the position shown in FIG. 2, there is a slight depression of the webbing 28 into the aperture 18. This will ensure that the webbing 28 on the tension side of the adjustor 10 will always be urging the clamp element 12 to rotate into the locked position.

The projection 27 avoids the need for a spring between the shaft 13 and the clamp element 12. This reduces the number of components needed for the adjustor 10. This simplifies both manufacture and assembly and reduces the cost of the adjustor 10.

Figure 4:
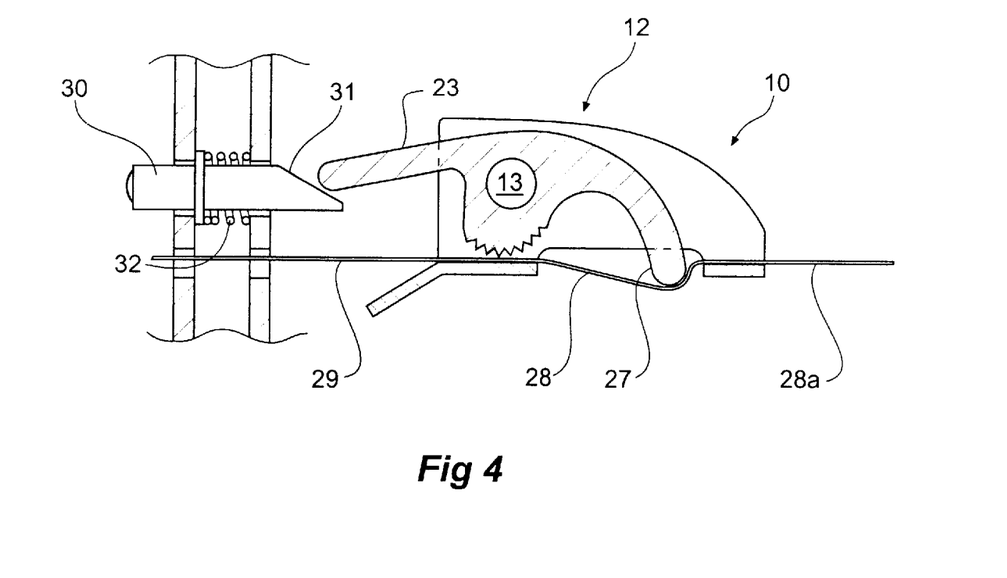
FIG. 4 shows a cross sectional view of a second embodiment of an adjustor incorporating a push button actuator.
Figure 5:
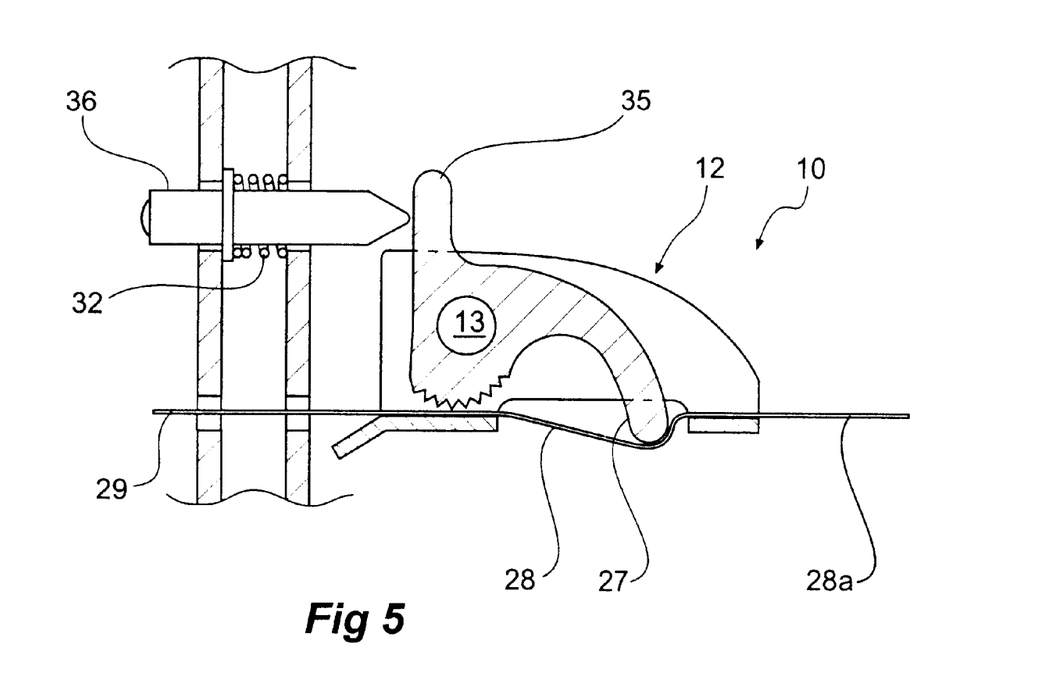
FIG. 5 shows a third embodiment showing an alternative push button actuator.

FIGS. 4 and 5 show two variations for manual actuation of the adjustor 10. In each case, a button is positioned to operate a flange on the clamp element. In the embodiments shown in FIG. 4 and 5, load is applied to the webbing 28a on the right-hand side of the adjustor 10 shown in these figures. The webbing 29 on the left-hand side is a free end.

In the embodiment shown in FIG. 4, the button 30 has a ramped surface 31 which abuts against the end of the flange 23. Depression of the button 30 results in an upward lift being applied to the flange 23.

In FIG. 5, the flange 35 is orientated vertically with the end of the button 36 abutting against the flange 35.

In both embodiments shown in FIGS. 4 and 5, a spring 32 pushes the button 30, 36 away from the adjustor 10 and acts to return the button 30, 36 to this position after it is depressed.

A fourth embodiment is shown in FIGS. 6 to 9. In this embodiment, the adjustor 110 has a bracket 111. The bracket 111 is U-shaped and has a pair of side walls 115 and a base wall 116. An aperture 118 is located in the base wall 116. The clamp element 112 is pivotally mounted to the bracket 111 via shaft 113 in a similar manner to the first embodiment.

The clamp element 112 has a flange 123 which is pushed to cause rotation of the clamp element 112. The clamp element 112 has a locking cam 124 with an arcuate surface comprising saw-tooth ridges 125. As in the first embodiment, the center of the part circle forming the arcuate surface for locking cam is displaced from the longitudinal axis of the shaft 113. Clockwise rotation of the clamp element 112 will result in the saw-tooth ridges 125 moving towards the base wall 116.

Figure 6:
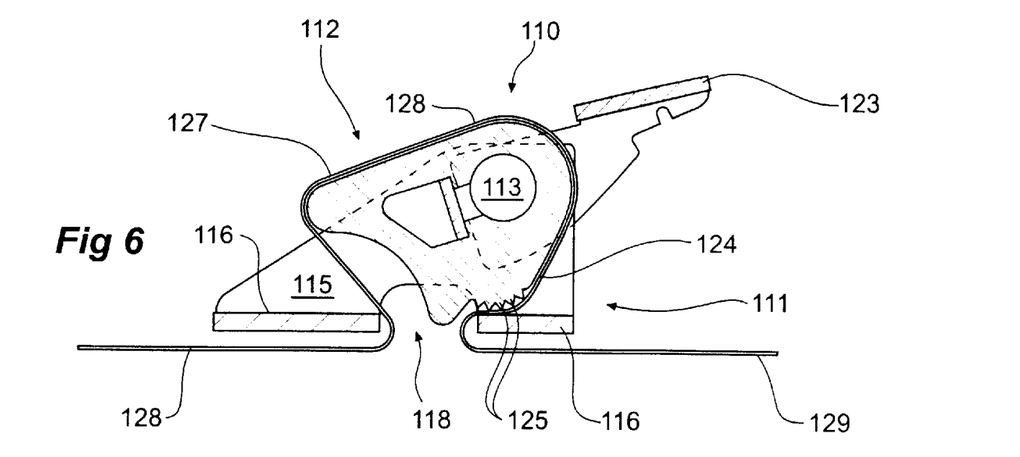
FIGS. 6 to 8 show cross-sectional views of a second embodiment of an adjustor.
Figure 7:
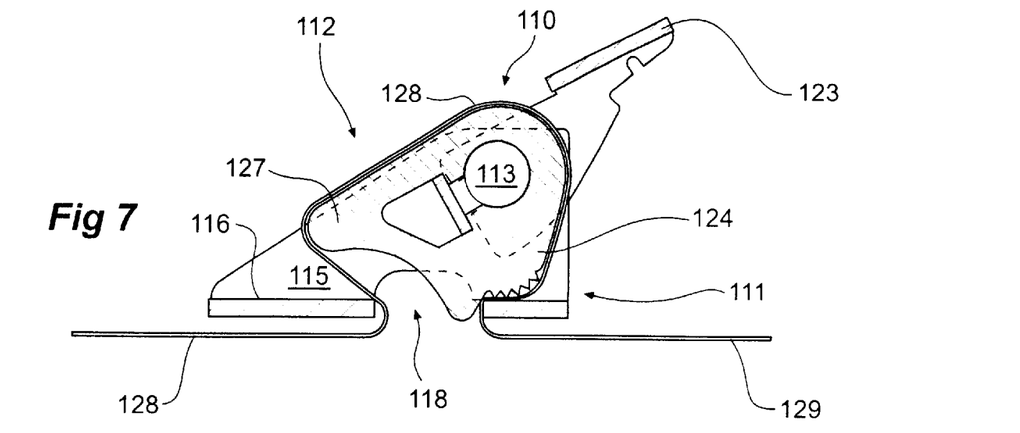
Figure 8:
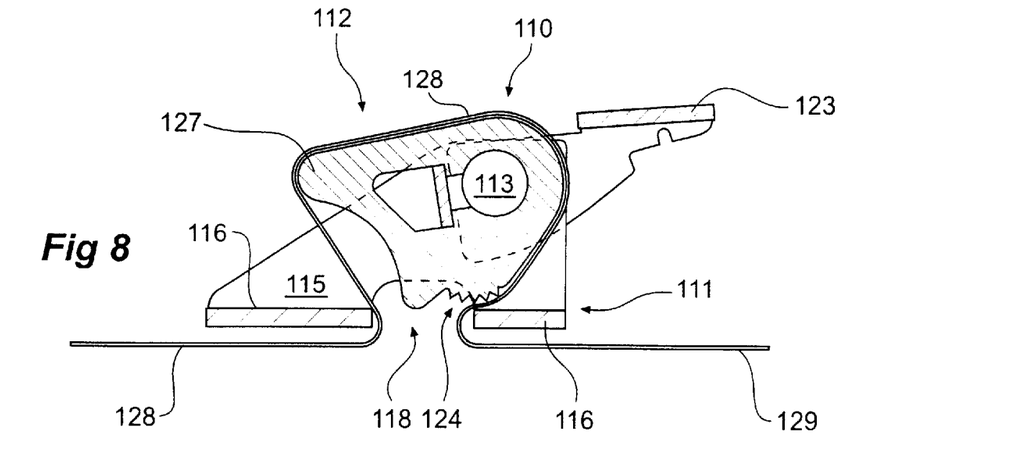
Figure 9:
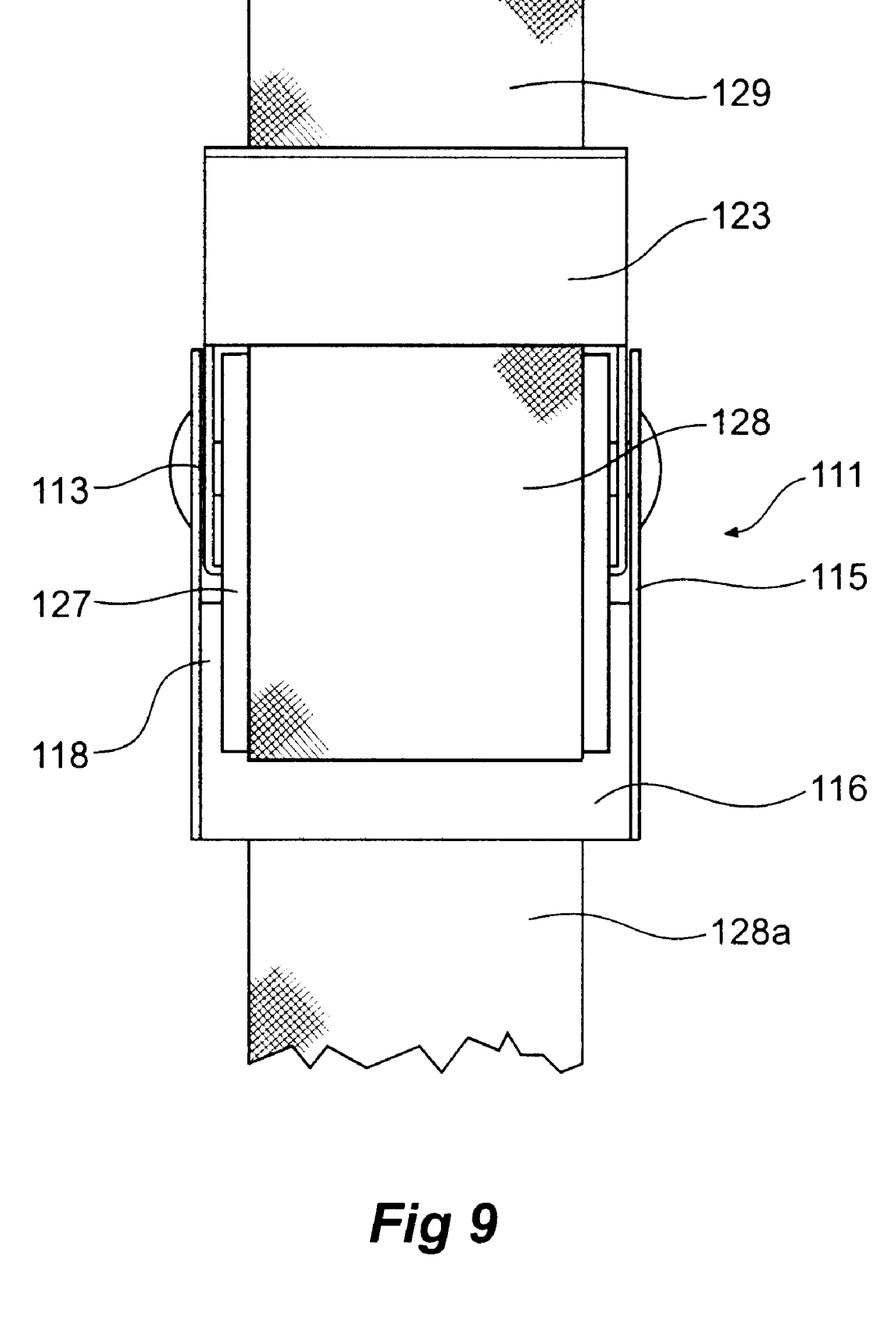
FIG. 9 shows a plan view of the embodiment shown in FIGS. 6 to 8, FIGS. 10 and 11 show cross-sectional views of a third embodiment of an adjustor.

FIGS. 6 to 8 show the path taken by webbing 128 through the actuator 110. The webbing 128 passes firstly through the aperture 118 and between the saw-tooth ridges 125 of the locking cam surface 124 and the base plate 116. The webbing 128 locates around the clamp element 112 so that it can then pass back through the aperture 118.

The clamp element 112 has a projection 127 and the webbing 128 passes over the projection 17.

The actuator 110 is shown in a partly locked position in FIG. 6. When tension is applied to the webbing 128 which is located on the left-hand side of the adjustor 110 as shown in FIGS. 6 to 8, the clamp element 112 is caused to rotate in an anti-clockwise direction. The movement into a locking position is illustrated in FIGS. 6 and 7 where the clamping element 112 moves from a partially locked position in FIG. 6 to a fully locked position in FIG. 7. The tension force applied to the webbing 128 pulls against projection 127 which causes rotation of the clamp element 112 in the counter-clockwise direction.

Continued application of tension within the webbing 128 on the left-hand side of the adjustor 110 will maintain the clamp element 112 in its locked position.

The right-hand side of the webbing shown in FIGS. 6 to 8 is also known as the free end 129. The clamp element 112 can be released from the locking position by pulling the free end 129 of the webbing 28. By pulling the free end 129, the clamp element 112 is rotated in a clockwise direction. Provided that all tension is released from the left-hand side of the webbing 128, this rotation will unlock the clamp element 112 thereby allowing the webbing 128 to be pulled through the adjustor 110.

Alternatively, as shown in FIG. 8, the flange 123 can be depressed to fully rotate the clamp element 112 to an unlocked position. In this position, the webbing 128 can be freely pulled through the adjustor 110 in either direction. Any tension applied to the left-hand side of the webbing 128 shown in FIG. 8 will cause a downward force to be applied to the projection 127. This will in turn cause rotation of the clamp element 112 into a locked position. Pulling the free end 129 as shown in FIG. 8 will tend to maintain the clamp element 112 in an unlocked position.

Figure 10:
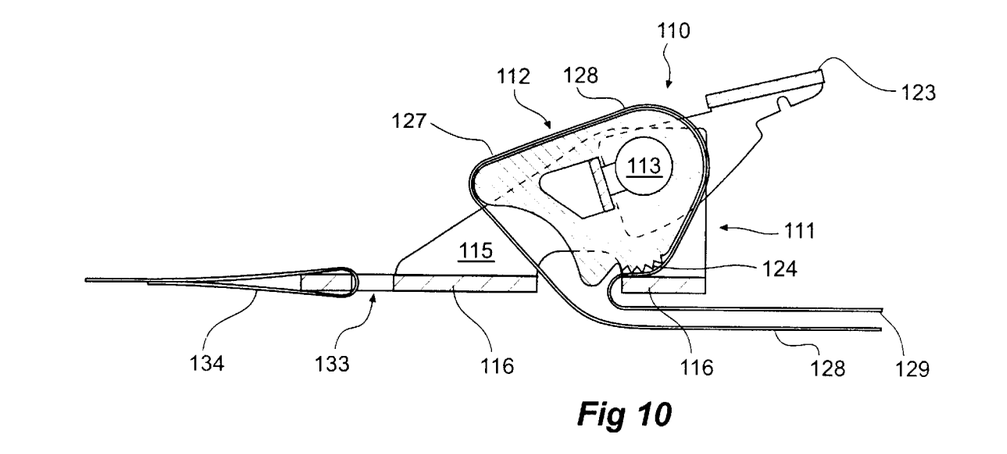
Figure 11:
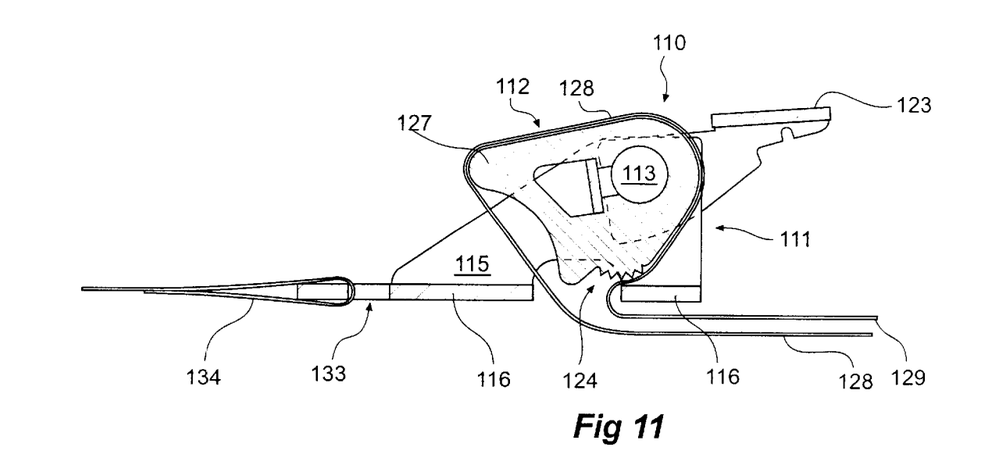

FIGS. 10 and 11 show a variation of the embodiment shown in FIGS. 6 to 9. The same adjustor 110 can be used as an inline belt length adjustor. In this case, the webbing 128 approaches and leaves from the same side of the adjustor 110 which in this embodiment, is the right-hand side as shown in FIGS. 10 and 11. On the left-hand side of the adjustor 110, there is provided an aperture 133 in the base wall 116 which enables attachment of webbing 134. The adjustor 10 shown in FIGS. 9 and 10 function exactly in the same way as the adjustor shown in FIGS. 6 to 8.

Although all of the above described embodiments of the invention will function without a torsion spring acting between the bracket 11, 111 and the clamp element 12, 112 a spring may be incorporated within these embodiments to improve the tactile feel of the clamp element 12, 112 when it is rotated using the flange 23, 123.

Figure 12:
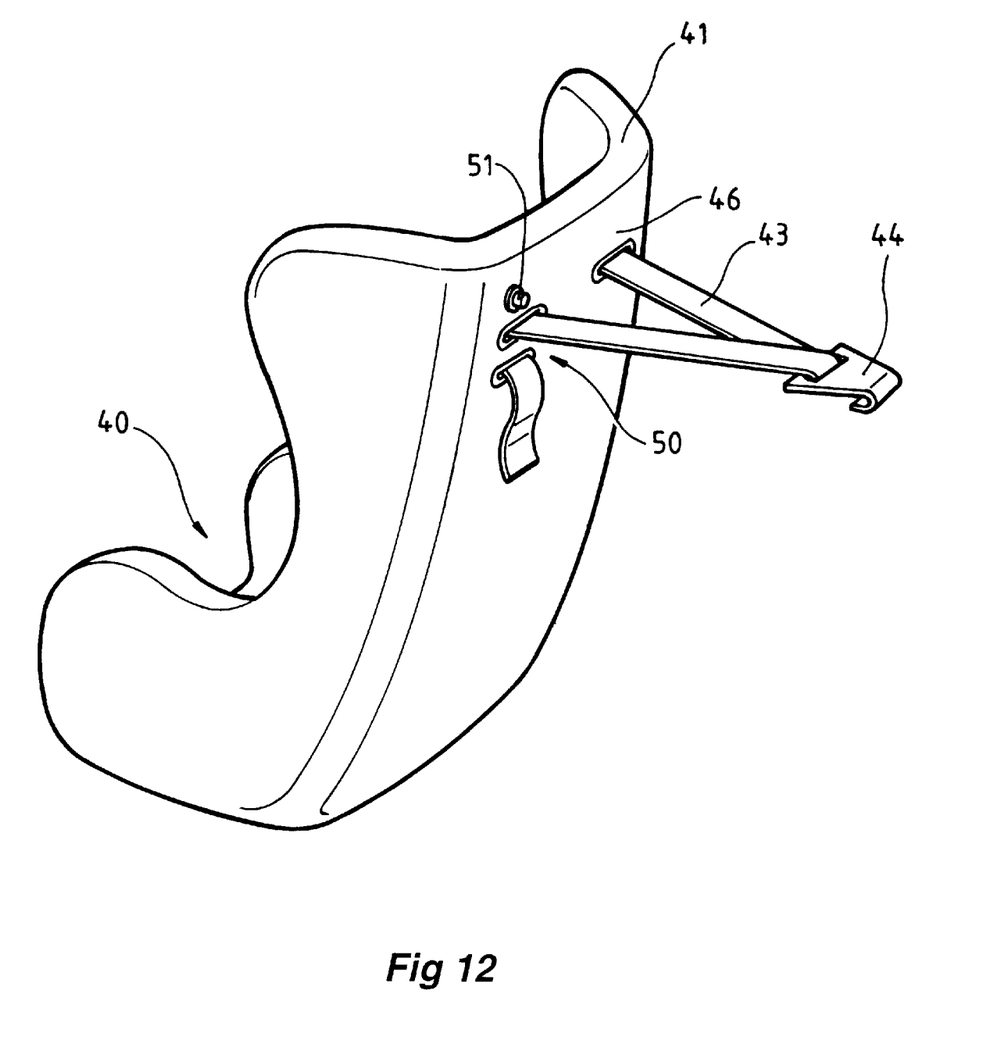
FIG. 12 shows a child car seat with an integrally formed webbing guide according to the present invention.

FIG. 12 shows a child car seat with an integrally formed webbing guide according to another embodiment of the present invention.

In this embodiment a child car seat 40 has a back 41 which is formed as a plastics material molding. The seat is restrained in a vehicle by a tether strap 43 which includes a attachment arrangement 44 by which the seat can be fastened to a anchor point. The tether strap is fastened at one side of the back of the seat back 41 at 46 and at the other side of the seat back 41 there is an integral webbing length adjuster 50 according to this invention. In this arrangement the webbing guide comprises a portion of the shell of the seat molded to form the webbing guide and an actuating button 51 is provided to operate the webbing length adjuster to enable release of the tether strap to adjust the length. Tension applied to the tether strap 43 will cause the webbing length adjuster 50 to grip the tether strap to restrain movement.

Throughout this specification various indications have been given as to the scope of this invention but the invention is not limited to any one of these but may reside in two or more of these combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

The claims defining the invention are as follows:

1. A webbing length adjustor for releasably clamping webbing that extends through the adjustor from a first side to a second side so that a tension side of the webbing is on the first side of the adjustor and the free end of the webbing is on the second side, the adjustor comprising:

a webbing guide having a webbing guide surface located on the second side, a guide bar located on the first side spaced from the guide surface and a pair of side walls;

a clamp element pivotally mounted with respect to and between the pair of side walls so that the webbing locates between the clamp element and the webbing guide with the webbing extending over the webbing guide surface and the guide bar;

a locking cam on the clamp element positioned adjacent the webbing guide surface which rotates into a locking position to clamp the webbing between the locking cam and the guide surface to prevent movement of the webbing through the adjustor when force is applied to the tension side of the webbing;

a release actuator to cause rotation of the clamp element to move the locking cam to a position where the webbing is released to allow the webbing to move in either direction through the adjustor; and a projection on the clamp element that is positioned between the webbing guide surface and the guide bar and abuts against the webbing so that tension in the webbing causes or urges the clamp element to rotate so that the locking cam rotates to or is held in the locking position, the release actuator being spaced from the projection so as to be clear of the webbing when the projection is in engagement therewith.

2. The webbing length according to claim 1, wherein the projection on the clamp element is of arcuate shape and extends away from an axis of rotation of the clamp element.

3. The webbing length adjustor according to claim 1, wherein the locking cam has a surface designed to grip or otherwise positively catch against the surface of the webbing.

4. The webbing length adjustor according to claim 1, wherein the webbing guide is provided with a recess into which the projection locates and the webbing is pushed into the recess by the projection so that its path from the locking cam is into the recess, around an end of the projection and back out of the recess and onto a surface of the webbing guide.

5. The webbing length adjustor according to claim 1, wherein the projection is adapted to always deflect the webbing, even when the clamp element is in its locked position.

6. The webbing length adjustor according to claim 5, wherein the projection extends below the webbing guide surface and the guide bar that supports the webbing so that the webbing therebetween is deflected.

7. The webbing length adjustor according to claim 1, wherein the release actuator comprises a manual actuator.

8. The webbing length adjustor according claim 7, wherein the release actuator comprises a flange which is lifted or pushed by at least one finger of a person.

9. The web length adjustor according to claim 7, wherein the release actuator comprises a button actuator used to cause rotation of the clamp element.

10. A webbing length adjustor for releasably clamping webbing that extends through the adjustor from a first side to a second side so that a tension side of the webbing is on the first side of the adjustor and the free end of the webbing is on the second side, they adjustor comprising:
- a webbing guide having a webbing guide surface, a guide bar spaced from the guide surface and a pair of side walls;
- a clamp element pivotally mounted with respect to and between the pair of side walls so that the webbing locates between the clamp element and the webbing guide with the webbing extending over the webbing guide surface and the guide bar;
- a locking cam on the clamp element positioned adjacent the webbing guide surface which rotates into a locking position to clamp the webbing between the locking cam and the guide surface to prevent movement of the webbing through the adjustor when force is applied to the tension side of the webbing;
- a release actuator to cause rotation of the clamp element to move the locking cam to a position where the webbing is released to allow the webbing to move in either direction through the adjustor; and
- a projection on the clamp element that is positioned between the webbing guide surface and the guide bar and abuts against the webbing so that tension in the webbing causes or urges the clamp element to rotate so that the locking cam rotates to, or is held in, the locking position, wherein the webbing guide comprises a portion of the shell of a seat of the child safety seat which is molded to form the webbing guide.

11. A webbing length adjustor for releasably clamping webbing that extends through the adjustor from a first side to a second side so that a tension side of the webbing is on the first side of the adjustor and a free end of the webbing is on the second side, the adjustor comprising:
- a webbing guide having a webbing guide surface located on the second side, a guide bar located on the first side and spaced from the guide surface by an aperture and a pair of side walls;
- a clamp element pivotally mounted with respect to and between the pair of side walls so that the webbing locates between the clamp element and the webbing guide with the webbing extending over the webbing guide surface and the guide bar;
- a locking cam on the clamp element positioned adjacent the webbing guide surface which rotates into a locking position to clamp the webbing between the locking cam and the guide surface to prevent movement of the webbing through the adjustor when force is applied to the tension side of the webbing;
- a release actuator to cause rotation of the clamp element to move the locking cam to a position where the webbing is released to allow the webbing to move in either direction through the adjustor; and
- a projection on the clamp element that is positioned between the webbing guide bar and communicates with the aperture and the projection is separate from the release actuator and abuts against the webbing so that the tension in the webbing urges the clamp element to rotate so that the locking cam rotates to, or is held in, the locking position.

12. The webbing length adjustor according to claim 11, wherein the projection is adapted to always deflect the webbing, even when the clamp element is in its locked position.

13. The webbing length adjustor according to claim 11, wherein the projection on the clamp element is of arcuate shape and extends away from an axis of rotation of the clamp element.

14. The webbing length adjustor according to claim 11, wherein the locking cam has a surface designed to grip or otherwise positively catch against the surface of the webbing.

15. The webbing adjustor according to claim 11, wherein the release actuator comprises a manual actuator.

* * * * *